Oct. 6, 1970 J. RAMEE 3,531,880
COMBINATION IDENTIFICATION DISPLAY AND GATE KEY CARD
Filed Jan. 8, 1969
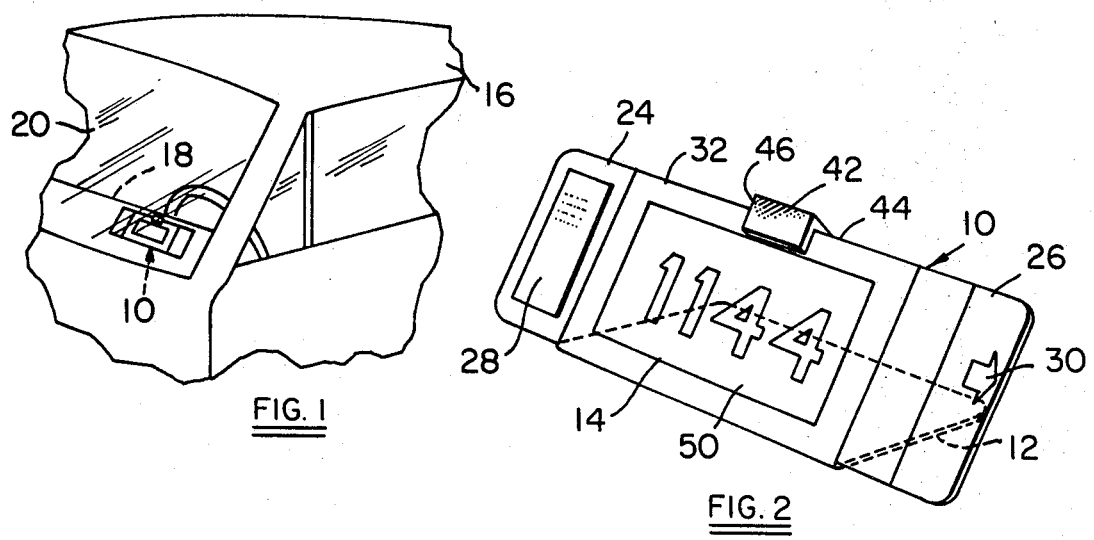
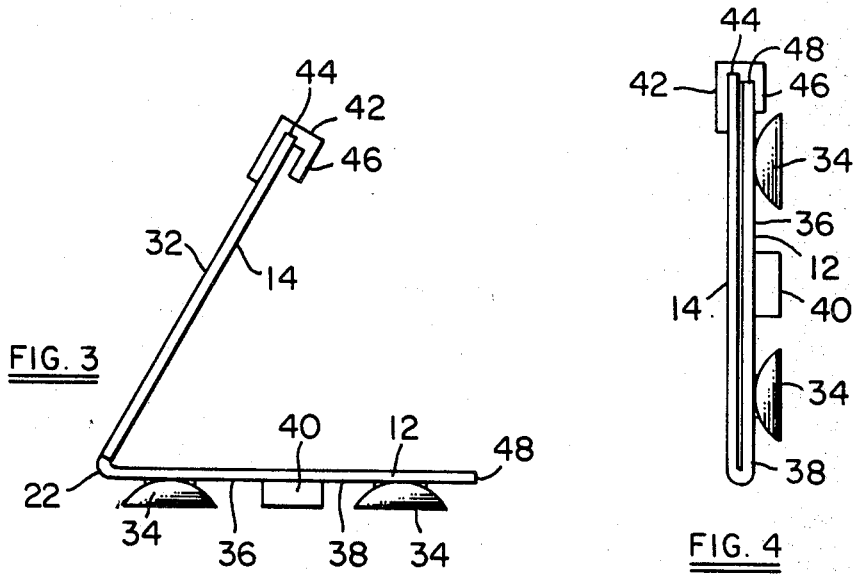
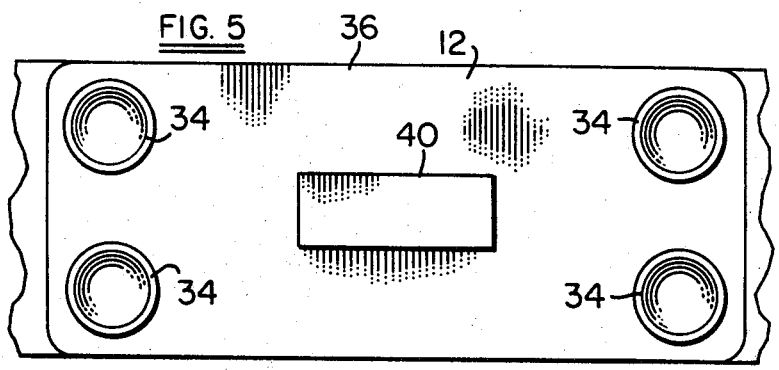
INVENTOR.
JOHN RAMEE
BY *Karl L. Spivak*
ATTORNEY.

United States Patent Office 3,531,880
Patented Oct. 6, 1970

3,531,880
COMBINATION IDENTIFICATION DISPLAY AND GATE KEY CARD
John Ramee, 779 Mancill Road, Wayne, Pa. 19087
Filed Jan. 8, 1969, Ser. No. 789,682
Int. Cl. G09f 1/00
U.S. Cl. 40—124.1                       6 Claims

ABSTRACT OF THE DISCLOSURE

A combination identification display and gate key card including a support provided with metal surface attracting magnets and a display area carried above the support and foldable thereon, the said display area including a flat surface for display of any desired indicia and wherein the said display area terminates outwardly in an automatic magnetic gate operating key.

---

The present invention relates to the general field of small display devices, and more particularly, is related to a display card suitable for use in an automobile and particularly adapted for identification and entry purposes in private parking lots.

It is common practice for many institutions, industries, commercial enterprises and similar organizations to offer private parking facilities for employees, students and other regular visitors by providing privately owned and operated parking areas adjacent to the business structure. In view of the fact that there are usually more automobiles in the vicinity than there are parking facilities, such privately owned and operated parking lots must provide methods for assuring that only authorized vehicles can gain entrance and that unauthorized vehicles will be excluded.

Prior workers in the field have devised the use of adhesive backed identification labels so that a parking lot attendant can easily visually observe whether or not a required parking permit has been issued to a given vehicle. Such identification labels are normally applied either to the windshield of the vehicle or exteriorly to the bumper. The prior art identification labels are satisfactory to a degree, but are subject to certain obvious and troublesome shortcomings. In order to be effective, the parking lot owner must provide an attendant or attendants to thereby police the sticker requirement prior to allowing an automobile to enter upon the lot. This of course results in increased costs of operation, in view of the fact that one or more paid employees must thereby be hired to regulate the traffic approaching the parking lot. Further, such adhesive affixed labels offer considerable difficulty when the automobile owner desires to remove these identification devices. Especially, as in the case of the bumper affixed labels, the removal chore becomes quite onerous.

The presently available vehicle affixed identification labels are further deficient in that they apply only to a single automobile and cannot be readily transferred to another automobile when desired, such as in the case where the permit holder owns two automobiles or perhaps sells or trades the vehicle to which the label is affixed.

In an attempt to overcome the problem of hiring additional parking lot attendants to visually police the permits affixed to automobiles, automatic gates have been developed to close the entrance to the private parking lots. Such automatic gates are usually operated either by a coin or by a magnetic type of key card which is issued to all authorized users. These cards are readily subject to loss and are troublesome to a degree in that the automobile owner must make sure to carry the card on his person at all times to thereby assure that the card will be available to open the automatic gates when the car is driven to the entrance of the parking lot.

The present invention seeks to overcome all of the shortcomings of prior art devices by providing a single, combination, readily adaptable display device that will always be readily available for use both in identifying a vehicle and in operating automatic gate devices. The present invention includes a base for removably mounting the display card within an automotive vehicle and includes in a unitary structure, areas for mounting identification labels, areas for affixing magnetic automatic gate keys and other areas for affixing cards such as identification cards, charge cards or other similar functions.

The present invention further includes provisions for a large identification sticker thereby permitting visual policing of the sticker while in use. In addition, the large display area assists materially in the recovery of lost or out-dated display cards.

It is therefore an object of the present invention to provide an improved device of the type set forth.

It is another object of the present invention to provide a combination identification display and gate key card which provides a readily visible area for automobile permit display purposes.

It is another object of the present invention to provide a combination identification display and gate key card including readily detachable, surface attracting means.

It is another object of the present invention to provide a combination identification display and gate key card that is readily portable in nature, which may be easily removed and displayed in any one of a number of automotive vehicles and which may be positioned at either the front or rear of the automobile.

It is another object of the present invention to provide a novel combination identification display and gate key card which includes in combination the means for operating automatic private parking lot entrance gates.

It is another object of the present invention to provide a combination identification display and gate key card that includes means for compacting the device so that it may readily fit within the pocket of the owner.

It is another object of the present invention to provide a combination identification display and gate key card that is inexpensive in manufacture, simple in construction and trouble free when in use.

Other objects and a fuller understanding of the invention will be had by referring to the following description and claims of a preferred embodiment thereof, taken in conjunction with the accompanying drawings wherein like reference characters refer to similar parts throughout the several views and in which:

FIG. 1 is a perspective view, showing the invention applied to the dashboard of an automobile.

FIG. 2 is a front perspective view of the invention.

FIG. 3 is an end elevational view of the invention in display position.

FIG. 4 is an end elevational view of the invention in folded position.

FIG. 5 is a bottom plan view of the invention.

Although specific terms are used in the following description for the sake of clarity, these terms are intended to refer only to the particular structure of my invention selected for illustration in the drawings and are not intended to define or limit the scope of the invention.

Referring now to the drawings, the device includes a generally elongated display structure 10 constructed with a base 12 and an integral, flat display area 14 which is supported thereon. As seen in FIG. 1, the structure 10 is especially designed and suitable for use in an automobile 16 and may be removably carried upon the top of the dashboard 18 for convenient viewing.

The display structure 10 is preferably formed from a single sheet of plastic material which bends at the junction 22 to thereby support the display area 14 above the base 12 at an angle of approximately sixty degrees. The lateral ends 24, 26 of the display area 14 transversely overhang the base 12 and thereby provide convenient, free-standing areas for attachment of devices such as a credit card 28 and a magnetic, automatic gate operating key 30 both of which are of conventional design and are affixed to the lateral ends 24, 26 using conventional methods. Thus, the display structure 10 may be readily removed from the automobile dashboard 18 and inserted endwise into either a magnetic automatic gate operator (not shown) or a credit card imprinting device (not shown) in the usual manner. The lateral ends 24, 26 thus serve to provide convenient areas for affixing devices such as gate operating keys 30 and credit cards 28 in permanent fashion to thereby furnish a single area for storing such devices thus eliminating the inconvenience and annoyance of carrying a plurality of separate cards when operating an automobile. In addition, the lateral extension 24, 26 combine with the central display area 32 to provide a card of extended overall length, thereby facilitating insertion of the gate key 30 into the gate operator (not shown) without opening the car door, as might be required when used by short persons.

The central area 32 receives a conventional adhesive backed parking permit display label 50 which adheres thereto in conventional manner for automobile identification when the display of such a label is necessary or desirable. It should be noted that the display structure may be readily moved from the front dashboard 18 to display at the rear window (not shown) of the automobile when it is so desired, without marring or otherwise disturbing the interior finish of the automobile in any respect.

The display base 12 spaces above the dashboard 18 by employing a plurality of rubber grommets 34 which adhesively adhere to the bottom 36 of the base 12 in well-known manner. The grommets 34 serve to reduce vibration and sway and thereby provide steady, secure attachment means between the display structure 10 and the automobile structure 16. It should be noted that the grommets 34 are fabricated of rubber or other similar resilient material which further serve to prevent marring of the automobile surface finish when the display device is in use. As an added feature, the entire bottom surface 36 of the base 12 may be coated with a luminous, reflective material 38 such as luminous paint. In this manner, an inexpensive, readily available, emergency display can be provided for a placement on the highway in emergency situations in the event that the automotive vehicle should become inoperable.

A magnet 40 adheres to the bottom 36 of the base 12 intermediate the grommets for readily affixing the display structure 10 to any metallic surface through the use of magnetic attraction in well-known manner. The present invention includes a base for removably mounting the display card within an automotive vehicle and includes in a unitary structure, areas for mounting identification labels, areas for affixing magnetic automatic gate keys and other areas for displays such as identification cards, charge cards or other similar functions.

As best seen in FIGS. 3 and 4, a plastic clip 42 affixed to the top 44 of the central display area 32 in any well-known manner such as by heat sealing to provide a forwardly positioned, overhanging lip 46. As best seen in FIG. 4, the base 12 folds about the junction 22 in a resilient manner to closely overlie the display area 14 in side by side relationship. The edge 48 of the base 12 interfits with the lip 46 by flexing the base 12 as necessary to urge the edge 48 under the lip 46 to thereby lock the base 12 in juxtaposed position with relation to the display area 14. In this manner, the entire display structure 10 may be readily compacted into a double sheet of relatively thin configuration to thereby conveniently fit within the pocket of the user. Thus, the display structure may be easily removed from the vehicle 16 when so desired and may be thus conveniently carried by the owner in his pocket without bulging or other inconvenience.

When it is desired to again use the display structure for display purposes, the base 12 should be flexed with relation to the display area 14 until the base edge 48 clears engagement with the lip 46. The natural resiliency and member of the material will automatically cause the display area 14 to assume the display position of FIGS. 2 and 3.

Although I have described my invention with a certain degree of particularity, it is understood that the present disclosure has been made only by way of example and that numerous changes in the details of construction and the combination and arrangement of parts may be resorted to without departing from the spirit and scope of the invention as hereinafter claimed.

What is claimed is:
1. In an identification display structure for mounting upon a surface, the combination of
   (A) a base,
      (1) said base being provided with magnetic attaching means for affixing to the said surface, and
      (2) said base being further provided with a plurality of resilient spacing means,
         (a) said spacing means spacing the said base above the said surface; and
   (B) a display area integral with the said base and carried at an angle approximately sixty degrees therefrom,
      (1) said display area joining said base in a bendable junction,
      (2) portions of the said display area respectively transversely extending laterally from the said base to provide a pair of spaced, lateral ends.

2. The invention of claim 1 wherein one of the said lateral ends is provided with a magnetic, automatic gate operating key.

3. The invention of claim 1 wherein one of the said lateral ends is provided with a magnetic, automatic gate operating key and wherein the other said lateral end is provided with a credit card attaching area.

4. The invention of claim 1 wherein the top edge of the said display area is provided with a medially positioned clip, the said clip being provided with an overhanging lip.

5. The invention of claim 1 wherein the top edge of the said display area is provided with a medially positioned, partially open clip, the said clip being provided with an overhanging lip which downwardly extends in spaced relationship with said bendable junction.

6. The invention of claim 1 wherein the top edge of the said display area is provided with a medially positioned, partially open clip, the said clip being provided with an overhanging lip which downwardly extends in spaced relationship with the said display area, the said lip opening in the direction of the said bendable junction, and the said lip being positioned to engage an edge of the said base when the base and the display area are urged together by bending at the said bendable junction.

References Cited
UNITED STATES PATENTS

| | | | |
|---|---|---|---|
| 1,448,823 | 3/1923 | Bernard | 40—124.1 |
| 1,463,326 | 7/1923 | Kristofek | 40—124.1 |
| 1,953,673 | 4/1934 | Davidson | 40—124.1 |
| 2,637,920 | 5/1953 | Stratton | 49—35 |
| 2,839,858 | 6/1958 | Williams. | |

EUGENE R. CAPOZIO, Primary Examiner

W. J. CONTRERAS, Assistant Examiner

U.S. Cl. X.R.

40—129